United States Patent [11] 3,624,251

[72] Inventor Wolfgang Huber
San Francisco, Calif.
[21] Appl. No. 3,492
[22] Filed Jan. 16, 1970
[45] Patented Nov. 30, 1971
[73] Assignee Diagnostic Data, Inc.
Palo Alto, Calif.

[54] ORGOTEIN PURIFICATION PROCESS BY HEATING ABOVE 65° C.
14 Claims, No Drawings
[52] U.S. Cl. .................................................... 260/113, 260/112 R, 424/177
[51] Int. Cl. ..................................................... A61k17/00, C07g 7/04
[50] Field of Search ........................................... 260/112, 113

[56] References Cited
FOREIGN PATENTS
1,160,151 7/1969 Great Britain

Primary Examiner—Howard E. Schain
Attorney—Millen, Raptes & White

ABSTRACT: Heat labile tenacious proteins present in samples of substantially pure orgotein produced by a process which comprises a heating step in which a mixture of proteins comprising the orgotein protein and substantial amounts of other proteins are heated under conditions which do not affect the orgotein, are eliminated therefrom by a second heating step of a solution of the substantially pure orgotein in a buffer containing divalent metal ions at a temperature higher than employed in the prior heating step.

ns

3,624,251

ORGOTEIN PURIFICATION PROCESS BY HEATING ABOVE 65° C.

BACKGROUND OF THE INVENTION

This invention relates to the purification of orgotein, more particularly to the removal of tenacious proteins present in substantially pure orgotein.

In prior filed U.S. Pat. application Ser. No. 576,454, filed Aug. 31, 1966, now abandoned in favor of application Ser. No. 15,883, filed Mar. 2, 1970, of which I am coapplicant, there is described a process for the purification of orgotein. Orgotein is the nonproprietary name assigned by the United States Adopted Name Council for a substantially pure, compact, water-soluble, nontoxic, substantially nonantigenic, antiinflammatory protein in the form of a metal chelate with a divalent metal. (See J.A.M.A., May 26, 1969; Vol 208, No. 8). That process is also the subject of Belgium Pat. No. 687,828 and British Pat. No. 1,160,151. The process is a multistep process which in its preferred form isolates orgotein form beef liver by the successive steps of (a) slurrying finely ground fresh beef liver in ice cold buffer containing $Mn^{++}$ ion until substantially all the soluble proteins are extracted; (b) fractionally precipitating a substantial portion of the dissolved proteins in the cold buffer solution with acetone; (c) dissolving the precipitated portion in cold maleate buffer containing $Mn^{++}$ ions; (d) heating the resulting solution at 60° C. for about 20 minutes; (e) cooling the solution and removing the precipitated denatured proteins; (f) precipitating the residual dissolved proteins in the cold buffer solution with ethanol; (g) dissolving the precipitated proteins in cold maleate buffer solution containing $Mn^{++}$ ions; (h) lyophilizing the buffer solution; (i) dissolving the lyophilized solids in cold tris buffer containing $Mg^{++}$ ions and fractionally precipitating the proteins from the cold solution with ammonium sulfate; (j) dissolving the fractions insoluble in ammonium sulfate solution at 45 to 65 percent of saturation in cold tris buffer containing $Mg^{++}$ ions and chromatographing the solution through a column of Sephadex G-75 dextran resin; and (k) dialyzing, e.g., against water containing a small amount of a salt of Mg or other divalent metal and thereafter against $10^{-3}$ M orthophenantroline and finally pure water to remove buffer and nonchelated metal ions, to give about an 0.01 percent overall yield, calculated on the dry weight of the starting liver.

Despite this complex and exhaustive purification procedure, which ordinarily produces orgotein of at least 90 percent and usually substantially greater than 95 percent purity, traces of other proteins often are retained which can be detected on gel electrophoresis as a faint band which moves substantially slower than the multiple bands characteristic of orgotein. These slow-moving proteins can also be present in orgotein isolated from other tissue sources. They are not, however, present in orgotein isolated from mammalian red blood cells.

In my prior filed application Ser. No. 657,866, filed Aug. 2, 1967, there is disclosed an improved process for the isolation of orgotein from beef liver and other tissues which eliminates several steps and increases the yield substantially. However, the orgotein isolated by this process also often contains these tenacious residual proteins. In this improved process, after the step of chromatographically separating the proteins according to molecular size, using a porous resin which acts as a molecular sieve, the eluate fractions containing the orgotein are subjected to a second chromatographic step using a mixed bed resin having both strong acid and strong basic groups which partially neutralize each other internally while retaining absorptive attraction for both anions and cations. The first step separates the protein impurities of substantially larger or smaller molecular volume than orgotein and the second step removes buffer ions and excess metal ions, but neither of these steps remove these residual slow-moving proteins, which are of similar polarity and about the same molecular volume as orgotein.

Most production lots of orgotein contain no more than 5–10 percent of the residual protein. Even this small amount renders quality control difficult because the $A_{280}$ of these residual extraneous proteins is substantially higher than orgotein. In other lots, residual proteins other than orgotein in the final product can run even higher. At these levels the activity and allergenicity of orgotein are demonstrably affected. Such impure production lots represent a substantial expenditure of time and money. To discard them would increase substantially the overall cost of producing orgotein. However, heretofore there was no technically practical or economically feasible way of salvaging these unacceptable production lots.

In Ser. No. 576,454 and Belgium Pat. No. 687,828, the $A_{280}$ (1 mg./ml.) ultraviolet absorbance of substantially pure orgotein was reported to be about 0.585, ($A_{280}^{1\%} = 5.85$). This absorbance was attributed to the orgotein itself. Analytical studies of samples of orgotein free of tenacious extraneous proteins established that orgotein has a total of only 3 tyrosine and tryptophane groups, which are too few to account for this higher absorbance at $A_{280}$. Thus, the higher $A_{280}$ absorbance is due to the presence of the tenacious extraneous proteins, which are rich in these amino acids. As little as 2 percent of these proteins can raise substantially the $A_{280}^{1\%}$ of orgotein above the 2.3 ± 0.2 of pure orgotein. The higher $A_{280}$ absorbance of the tenacious extraneous proteins complicates quality control in production because of the profound effect on absorbance at $A_{280}$ of even trace amounts of this impurity.

As taught in Ser. No. 576,454, in the heat treatment step of the process for the production of orgotein disclosed therein, orgotein is heated at 60°–65° C. in a buffer solution containing a salt of a divalent metal ion having an ionic radius of 0.60 to 1.00 A. This step removes virtually all of the heat labile proteinaceous impurities. However, with orgotein isolated from beef liver and other tissue sources, small amounts of tenacious heat labile extraneous proteins are retained. A more rigorous heat treatment condition in the process of Ser. No. 576,454 cannot be employed to remove the extraneous proteins because to do so causes substantial losses or orgotein. For example, at this point in the process, at 70° C., about 25 percent of the desired protein is lost upon heating for about 15 minutes and about 75 percent or more is lost in 1 hour. The tenacious extraneous proteins are about as stable as orgotein to heating at temperatures of 60°–65° C. and thus survive that heating step. Since they have about the same molecular volume and solubility properties as orgotein, they also survive the subsequent isolation steps and thus are retained in the isolated orgotein.

The removal of these tenacious extraneous residual proteins appeared to present an almost insoluble problem, since they followed orgotein through all of the isolation steps. Even the very expensive technique of preparative gel electrophoresis proved to be only a partially successful means for doing so. On a commercial production scale, this would increase drastically the cost of producing orgotein.

SUMMARY OF THE INVENTION

According to this invention, samples of orgotein free of the tenacious proteins having about the same solubility as orgotein in buffer, in organic solvents and ammonium sulfate solutions and about the same molecular volume as orgotein and about the same heat stability as orgotein when in admixture with substantial amounts of other, more heat labile proteins, are obtained by subjecting samples of the orgotein protein containing these tenacious proteins to two heating steps, one under less stringent conditions, when the orgotein protein is substantially impure, and a subsequent one under more stringent conditions when the orgotein is substantially pure.

The discovery that the tenacious residual extraneous proteins can be eliminated from the orgotein by heating a buffer solution of orgotein samples containing them under more stringent conditions than can be employed when the orgotein is substantially impure was surprising because if one employs the same heating conditions in the initial heating step, virtually all of the orgotein is lost. Thus, the conditions employed in the first heat treatment step necessarily must be milder than those employed in the second heating step.

The discovery that substantially pure orgotein containing the aforesaid tenacious impurities is significantly more stable than its impure precursor at the heat treatment stage of the process for its production permits the removal of the tenacious slow-moving (on gel electrophoresis) protein impurity by the post-heating step of this invention. Whereas about 90 percent of the desired protein would have been lost in the first heating step if it were conducted at 70° C., e.g., for one-half to 1 hour, in the process of this invention no more than about 10–20 percent of the orgotein is lost, not including the weight loss due to the elimination of the protein impurity therefrom, by heating at the higher temperature.

OBJECTS OF THE INVENTION

It is an object of this invention to remove residual tenacious extraneous proteins having about the same molecular volume and solubility properties as orgotein from samples of orgotein containing them. It is another object to provide pure orgotein. Other objects will be apparent to those skilled in the art to which this invention pertains.

DETAILED DESCRIPTION OF INVENTION

Tenacious heat labile residual extraneous proteins having about the same molecular volume and solubility properties as orgotein are removed from orgotein which has undergone prior heat treatment to remove substantially all heat labile proteins and which is otherwise substantially or completely free of other proteinaceous impurities by heating a buffer solution thereof containing divalent metal ions of a metal having an ionic radius of 0.60 to 1.00 A., at a temperature above which impure orgotein is stable.

The substantially pure orgotein employed in the "post-heating" step of the process of this invention can be produced from a variety of tissue sources, preferably liver, e.g., beef, including steer and calf, sheep, including lamb, pork, horse and chicken, preferably beef liver. As used herein, substantially pure orgotein is orgotein of at least 90 percent purity, and more preferably at least 94 percent purity. The process is also useful for the purification of partially purified orgotein, e.g., of 80–90 percent purity, obtained by the aforesaid process. Most preferably, the orgotein employed has, as the only impurity present in significant amount, the above-described tenacious proteins.

Orgotein is readily soluble (to 50 mg./ml.) in water and common aqueous buffers, pH 6.5–10.0. The protein's metal ion content and composition are related to its pharmacodynamic activity. Bivalent cations with ionic radii of 0.6–1.0 A. are the most effective. A mixture of Cu, Mg, and Zn at a total content of 2–4 gram atoms per mole produces the highest level of physiological activity. The relative amounts of each of the three metals can vary broadly within this total. Most samples also contain trace amounts of Ca, Fe, and Si as the only other metals detectable by emission spectroscopy. All metals can be removed by prolonged dialysis against $10^{-2}$M EDTA or $10^{-4}$M orthophenanthroline. At levels below 2 gram atom per mole, the biological effectiveness is diminished, and below 1 gram atom per mole the protein progressively precipitates, losing biological activity. The metal ions thus appear to play a decisive role in maintaining the molecular conformation essential for biological activity, acting as "locking pins" by producing intramolecular cross links. Differences in affinity for buffer anions probably explain why, at identical strength, the new protein is less stable in certain buffers (phosphate, borate) than in others (Tris, maleate, EMTA).

Amino acid composition and physical properties of orgotein isolated from beef liver are listed below. The amino acid composition of congeners isolated from other species is remarkably similar. The data for hard-to-exchange amide hydrogen, the frictional ratio $f/f_o$, the Scheraga-Mandelkorn coefficient $\beta$, and the flat slope of the intrinsic viscosity curve, indicate that orgotein in solution is quite compact. Determination of exposed tyrosyl residues with N-acetyl imidazole showed that only one is titratable. Titration of $\epsilon$-amino groups using 2,4,6 trinitrobenzene sulfonic acid demonstrates that 15–16 $\epsilon$-amino groups are titratable. A single cysteine is exposed in the native molecule as judged by spectrophotometric titration with p-mercuri-benzoate. Reaction with hot orcinol reagent after prior hydrolysis with 6 N HCl at 100° C. reveals a small amount of carbohydrate.

The protein moves in a single, sharp band in the ultracentrifuge, both in free and in sucrose density sedimentation, and emerges as a single, sharp peak from a calibrated gel-filtration column (Sephadex G-200). In gel electrophoresis, the protein exhibits a reproducible, multiband pattern moving anodically from the origin. Under constant conditions of gel electrophoresis, this pattern is readily and quantitatively reproducible from batch to batch and has served as a valuable tool in the isolation of the protein.

Tests in 30 different enzyme systems, utilizing a broad range of substrates, have failed to reveal any significant activity when the protein was used in lieu of the enzyme in the respective assay system. Included were several each of the oxidoreductases, transferases, hydrolases, lipases and isomerases.

Orgotein is only weakly antigenic. An extensive immunization regime is required to produce antibodies in the rabbit reliably. Allergenicity tests in guinea pigs, using the classic Landsteiner technique with 10 intradermal injections spread over 22 days, followed by 2 weeks of rest and than a challenge injection, revealed no systemic reaction or other indication of sensitization. Immunoelectrophoretic examination of human sera with fluorescein-tagged protein failed to reveal the presence of precipitating or nonprecipitating antibodies in the sera of humans and horses undergoing intermittent clinical treatment with intramuscular injections of bovine orgotein over periods in excess of 1 year.

Orgotein is a remarkably effective anti-inflammatory agent, which activity manifests itself in several animal models of inflammation viz, carrageenin-induced rat paw edema, cotton pellet-induced rat granuloma, adjuvant-induced rat polyarthritis, and antigen-induced guinea pig skin edema. Within effective dose ranges it exhibits potent anti-inflammatory effects in the antigen-induced guinea pig skin edema and in the cotton pellet-induced rat granuloma test, particularly with adrenalectomized rats. It is moderately effective (about 30 percent inhibition at 2.5 mg./kg., using purebred wistar-derived rats) in the carrageenin-induced rat paw edema when tested at 3 hours. In adjuvant-induced polyarthritis, when given subcutaneously at 0.2 mg./kg., 5 days a week for 21 days, the new protein effectively protected the animals against the secondary stages of adjuvant arthritis, which are believed to be immunological in character.

In tables I and II are physical and chemical properties of orgotein. Amino acid composition data is presented as grams per 100 grams of protein. The molecular weight calculated from amino acid composition data is based upon the spectrophotometric determination of tyrosine as two residues. The sedimentation coefficient was determined at three different concentrations (0.39, 0.54, 0.77 g./100 ml.); specific viscosities at five different concentrations (0.0124–0.0452 g./ml.), and apparent specific volume at five different concentrations (0.0256–0.0763 g./ml.), both in 0.05 M phosphate buffer, pH 7.5. The frictional coefficient $f$ was calculated from the equation $f=M-(1-\bar{Y}\rho)/Ns$ and $f_o$ was calculated from the equation $f_o=6\pi\eta(3\ Mv/4\pi N)^{1/3}$. The value $f/f_o=1.114$ was calculated from the modified Einstein relationship recently derived by Polson $f/f_o=1/0.61\ \log\ [\eta]/v$. The value of M from the amino acid analyses was used in the calculation. The Scheraga-Mandelkern coefficient was used calculated from the equation $\beta=Ns[\eta]^{1/3}\eta/M^2/3\ (1-\bar{v}\rho)$. Hard-to-exchange amide hydrogen was determined with a 5 percent protein solution in $D_2O$ with spectra being scanned from 5.25–7.8 microns every 8 minutes between 10 and 40 minutes total elapsed time.

TABLE I.—PROPERTIES OF ORGOTEIN ISOLATED FROM BEEF LIVER

Elemental analysis: C, 50.05%; H, 92%; O, 25.15%; N, 16.00%, S, 1.1%; and P, Nil.

| | | | |
|---|---|---|---|
| Ala | 20 | Lys | 21 |
| Arg | 9 | Met | 4 |
| Asp | 34 | Phe | 9 |
| Cys/2 | 8 | Pro | 12 |
| Glu | 24 | Ser | 17 |
| Gly | 51 | Thr | 24 |
| His | 13 | Try | 1 |
| Ile | 16 | Tyr | 2 |
| Leu | 19 | Val | 30 |

Amino acid composition (residues per mole):
Molecular weight:

| | |
|---|---|
| Gel filtration | $34,000 \pm 750$ |
| Sucrose density gradient | $34,000 \pm 1000$ |
| Osmometry | $35,300 \pm 1000$ |
| Amino acid composition | 35,000 |
| Sedimentation coefficient, $s^\circ_{20}$, w sec. (0.85% saline) | $3.32 \times 10^{-13}$ |
| Isoelectric point, Citrate-phosphate buffer | $5.5 \pm 0.2$ |
| Isoionic point | $5.35 \pm 0.05$ |
| Absorbance. A. $\frac{a/o}{280}$ (glycine buffer, pH 8.5) | $2.3 \pm 0.2$ |
| Intrinsic viscosity, $[\eta]$ ml./g | 3.5 |
| Partial specific volume: | |
| $\bar{v}$ Ml./g, observed | 0.7219 |
| $\bar{v}$ Ml/g, calculated | 0.7224 |
| Frictional ratio, $f/f_o$ | 1.174, 1.114 |
| Scheraga-Mandelkern coefficient | $2.22 \times 10^{-6}$ |
| Hard-to-exchange amide hydrogen | >80% |

Amino acid composition of orgotein congeners. In table II, amino acid composition data is given as grams per 100 grams protein; 24-, 48-, and 72-hour hydrolyses were performed with norleucine as internal standard. Tryptophan was determined spectrophotometrically. Cystine/2 and methionine were determined after performic acid oxidation as cysteic acid and methionine-sulfone, respectively.

TABEL II.—AMINO ACID COMPOSITION OF ORGOTEIN CONGENERS

[grams per 100 grams of protein]

| | Liver, beef | Red blood cells | | | | |
|---|---|---|---|---|---|---|
| | | Beef | Sheep | Horse | Rabbit | Chicken |
| Ala | 6.4 | 6.3 | 6.2 | 5.9 | 6.0 | 7.3 |
| Arg | 2.9 | 2.6 | 3.2 | 2.0 | 2.8 | 1.6 |
| Asp | 10.7 | 11.2 | 11.4 | 10.8 | 10.8 | 11.4 |
| Cys/2 | 2.5 | 2.0 | 1.8 | 2.0 | 1.8 | 3.1 |
| Clu | 7.8 | 7.7 | 7.2 | 10.0 | 8.0 | 8.3 |
| Gly | 16.4 | 16.3 | 17.2 | 15.9 | 17.1 | 17.7 |
| His | 4.0 | 5.0 | 4.5 | 6.2 | 5.3 | 5.4 |
| Ile | 5.2 | 5.7 | 5.8 | 4.7 | 4.9 | 4.8 |
| Leu | 6.0 | 5.4 | 5.5 | 5.9 | 6.9 | 4.7 |
| Lys | 6.6 | 6.6 | 8.1 | 8.8 | 6.7 | 6.5 |
| Met | 1.2 | 0.8 | 0.6 | 1.7 | 0.8 | 1.0 |
| Phe | 2.8 | 2.5 | 2.2 | 2.9 | 2.8 | 2.6 |
| Pro | 4.0 | 4.1 | 4.8 | 3.7 | 4.2 | 4.1 |
| Ser | 5.4 | 5.3 | 4.7 | 4.8 | 5.7 | 4.6 |
| Thr | 7.8 | 7.7 | 6.2 | 5.2 | 6.6 | 5.8 |
| Try | 0.3 | 0.2 | 0.3 | 0.3 | Nil | 0.3 |
| Tyr | 0.6 | 0.7 | 0.6 | 0.3 | 0.2 | 0.7 |
| Val | 9.7 | 10.0 | 9.1 | 8.9 | 9.8 | 9.4 |
| Total | 100.3 | 100.1 | 99.4 | 100.0 | 100.4 | 100.3 |

PURIFICATION PROCEDURE

The temperature at which the orgotein is heated is at about 65° to 75° C., preferably about 70° C. Above 80° C., purified orgotein itself denatures too rapidly and the yield of pure orgotein drops substantially. Therefore, the temperature preferably is maintained below about 80° C.

The heating time required to remove all of the above-described extraneous heat labile protein varies inversely with the selected temperature. At 65° C. at least 1 hour is generally required. At 70° C., at least 30, preferably 45–60, minutes is preferred. At 75° C. only about 20 minutes is required, and no more than 30 minutes should be used because in 60 minutes at this temperature about one-half of the orgotein is destroyed.

The heating step is conducted in a buffer solution in which the orgotein is soluble and stable. Included are those at a pH between 1 and 4 and between 6 and 11. Preferred are those having a pH between 6 and 9. Examples of buffers which can be used are ammonium phosphate, tris (hydroxymethyl) amino-methane, maleic acid-NaOH, citric acid-sodium citrate, acetic acid-sodium acetate, citric acid-diammonium phosphate, succinic acid-NaOH, sodium acid maleate-NaOH. See also Gormoni, "Methods in Enzymology," Vol. I, pp. 136–146 (1955) especially buffers No. 5–8 and 10–18. The concentration of the buffer can vary widely within the very dilute range, e.g., from $10^{-4}$ to $10^{-1}$ M, preferably about $10^{-3}$ to $10^{-2}$ M. Glycine-saline buffer at about pH 8.5 works well and is a preferred buffer. Tris-saline, EMTA and borate buffers, preferably at about the same pH, also can be used.

To protect orgotein from denaturation, the buffer solution contains one or more soluble salts of a divalent metal having an ionic radius of 0.60 to 1.00 A., preferably 0.65 to 0.79 A. The concentration of the divalent metal salt can vary widely, e.g., from $10^{-6}$ to $1010^{-2}$ M. Some divalent metals will precipitate the orgotein at certain concentrations. Thus, salts of Mg, Mn, Ca, and Co ought be maintained at a concentration above 0.2 M or more preferably below 0.02 M. Cu and Zn salts also should be maintained below $10^{-4}$ and $10^{-5}$ M respectively. A mixture of $Mg^{++}$ at $10^{-3}$ M, $Cu^{++}$ at $10^{-4}$ M and $Zn^{++}$ at $10^{-5}$ M maintains the preferred metal content of the orgotein.

The efficacy of the post-heating process in selectively precipitating the tenacious residual extraneous heat labile proteins is also dependent on the concentration of the starting orgotein in the buffer solution. For best results, protein concentration should be from 5 to 20 g. per liter. Below 5 g./l. the heat treatment does not work well because of dilution factors and at above 20 g./l., e.g., at 50 g./l., the recovery of orgotein and increase in purity both become less favorable.

After heating, the precipitated proteins are separated, e.g., by filtration or centrifugation. The clear solution is then dialyzed to remove buffer ions, excess metal ions and soluble small protein fragments having high $A_{280}$ absorbance, followed by lyophilization to isolate the pure orgotein from solution, e.g., in the manner described in Ser. No. 574,474. Pharmacodynamic efficacy can be determined pharmacologically in the Ungar bioassay for anti-inflammatory activity, which should show at least 30 percent inhibition at 0.4 mg./kg. In ultraviolet spectrographic analysis, the $A_{280}^{1\%}$, after dialysis, should be below 3.0 and preferably about 2.3. The amino acid analysis of this purified bovine liver orgotein should show about two tyrosine and one tryptophane residues in the molecule.

Thin gel agarose plates (Analytical Chemists, Inc., Palo Alto, California) were used for electrophoresis. Buffer was 0.02 M Tris, 0.15 M glycine, 0.0003 M EDTA, 0.01 percent thymol, 0.01 percent sodium azide, pH 8.45. Running time was 30 minutes at 4mA and about 280–340 V. Stain was Amido Black or Coomassie Blue. Sample size was 1λ of a 25 mg./ml. protein solution.

For quantitative gel electrophoresis, stained, thin film agarose electropherograms were cut into strips and mounted on clean 1×3-inch microscope slides. Individual slides were inserted into the linear transport holder of the Gilford Spectrophotometer, Model 240, and read at 595 mμ, when stained with Amido Black. To maximize resolution the smallest aperture (0.05×2.3 mm.) was used. For orgotein, recorder sensitivity is greatest at an output ratio of 0.25, with a speed of 5.0 cm./min. and a linear transport speed of 1.0 cm./min. The resulting tracings were quantitated by planimetry. All readings were made in duplicate or triplicate and agreed within ± 0.5 cm.$^2$.

PREPARATION 1—SUBSTANTIALLY PURE ORGOTEIN a. Removal of Insoluble Material

Finely macerated fresh beef liver is mixed with cold 0.025 M tris-glycine buffer containing 0.01 M $Mn^{++}$ at pH 7.5 (2 liters per kg. of liver). Adjust pH to 7.5 if necessary. Thereafter, if the liver is fatty, 50 ml. of toluene per kg. of liver are added. The mixture is stirred 4–6 hours. The resulting suspension is centrifuged at 20,000 G for 10–20 minutes or pressed through plastic gauze and the insolubles discarded.

b. Removal of More Soluble Material

To the aqueous filtrate obtained in the preceding step is added rapidly and with thorough agitation 1.25 volumes of cold acetone (−10° C.) through a glass tube extending well below the surface of the mixture. The ensuing precipitate is immediately collected by centrifuging, e.g., for 10 minutes at 20,000 G. Completeness of precipitation is checked by adding an additional 0.25 to 0.50 volumes of acetone to the filtrate. Any additional precipitate is also collected. The precipitated proteins are immediately suspended with about 25 percent (V/V) of 0.025 M tris-glycine buffer containing 0.01 M $Mn^{++}$ at pH 7.5, calculated on the volume of the filtrate before addition of the acetone. The mixture is stirred in the cold room for several hours. The insolubles are removed by centrifuging and the clear supernatant is adjusted to achieve an about 10 percent protein concentration. Protein concentration can be determined by Biuret analysis as described herein.

c. Heat Labile Protein Removal

The thus-obtained buffer solution is heated rapidly to 60° C. with stirring in a stainless steel or glass-lined kettle and maintained at or close to 60° C. for 10–20 minutes. Thereafter, the mixture is cooled to 5° C. as rapidly as possible and the bulky precipitate is filtered in the cold room by slow suction over a broad filter surface or centrifuged at 12,000 to 16,000 G for 10 minutes. The precipitate is re-extracted, using small amounts of cold buffer, and the clear supernatants combined. The precipitate is discarded.

d. Removal of Less Soluble Material and Transchelation

The solution from the heat treatment step is concentrated, if necessary, to a protein concentration of at least 8 percent, that is, by using an ion selective membrane (Diaflo Membrane, Amicon Corp., Cambridge, Mass.) to selectively remove excess buffer. The protein solution is mixed slowly and with stirring with cold saturated ammonium sulfate solution containing $10^{-3}$ M $Mg^{++}$, $10^{-4}$ M $Cu^{++}$ and $10^{-5}$ M Zn$^{++}$ to a 45 percent $(NH_4)_2SO_4$ concentration. Stirring is continued for another 15 minutes and the resulting precipitate is removed by centrifuging at 20,000 G for 30 minutes at 0° C. and discarded. To the filtrate is added an additional amount of the saturated ammonium sulfate solution to bring the protein solution to 65 percent $(NH_4)_2SO_4$ concentration. The resulting precipitate contains the desired protein and is collected by centrifugation or filtration. The final supernatant is discarded.

e. Gel Filtration

The final precipitate from the $(NH_4)_2SO_4$ step is dissolved in 0.025 M tris-HCl or tris-glycine or 0.01 M phosphate or borate buffer, containing $10^{-hu}$ 3 M $Mg^{++}$, $10^{-4}$ M $Cu^{++}$ and $10^{-5}$ M $Zn^{++}$, at pH 7.8 to a concentration as close to 10 percent (w/v) as possible and dialyzed against cold buffer until negative to sulfate ion. The dialyzed solution, after clarification by centrifugation, if necessary, is passed through a Millipore filter. The filtrate is applied directly to the head of chromatography columns (3×18 in.) filled with Sephadex G-100 or G-75 (epichlorohydrin cross-linked dextran resin, Pharmacia, Sweden). The Sephadex has been swelled, refined and washed by standard techniques described in literature of the manufacturer. The packed columns are equilibrated with the above-described buffer and adjusted to a flow rate of about 20 ml. per hour. The addition of 5–10 percent dextrose or sucrose to the solution improves uniformity of adsorption, which facilitates subsequent resolution.

After application to the column, the sample is permitted to equilibrate within the first few cm. of the resin bed for approximately 30–45 minutes, at which time fractionation is started, the column being developed with additional buffer solution. Individual fractions of up to 10 ml. are collected. The emergence of peaks is determined by measuring the protein concentration by the absorbance at 280 millimicron.

Two and sometimes three peaks emerge from the column prior to the emergence of the orgotein. They represent albumin and other undesirable protein impurities of similar or larger molecular volume. Fractions representing these peaks are discarded. Using the conditions outlined, the desired protein generally emerges in the range of 100–150 ml. of total eluate. These fractions are combined for further processing. Residual, lower molecular weight protein impurities emerge from the column on further elution, particularly on increasing the ionic strength of the buffer. They are removed to clear the column for a subsequent run.

f. Buffer and Excess $Me^{++}$ Ion Removal

The buffer, $Mg^{++}$, $Cu^{++}$ and $Zn^{++}$ ion concentration is reduced to less than $10^{-7}$ M by dialysis or filtering the combined fractions containing the desired protein through a column of mixed bed resin Amberlite MB-1 Monobed gel-type Ion Exchange Resin, (Rohm & Haas), a styrene-divinyl benzene strongly acidic ($-SO_3-H^+$) and strongly basic ($-N^+(CH_3)_2CH_2CH_2OH^-$) group-containing mixed copolymer.

A column 1.45×45 inches is half filled with demineralized water from which all air bubbles have been removed. A slurry of the resin in air-free demineralized water is poured gently into the column and allowed to settle. The column is then back-washed several times with demineralized water to constant pH (ca. 7.0) and ionic strength (conductance about 1.0 mho) of the effluent. The final bed height is 33 inches, giving a bed volume of 58.3 cubic inches (957 milliliters) and total exchange capacity of 440 milliequivalents, based on a factor of 0.46 given by the manufacturer for this resin.

The fractions from the gel filtration step containing the desired protein are combined and concentrated, if necessary, to a protein content of 8–10 percent. This solution is carefully loaded onto the top of the column and thereafter developed with demineralized water. The flow rate is adjusted to about 20 milliliters per minute and the appearance of the protein in the eluate is followed by ultraviolet absorption ($A_{280}$). The eluate is collected in about 25 milliliter fractions. The orgotein generally appears in the fourth to twelfth fractions. Buffer-$Me^{++}$ concentration drops well below $10^{-7}$M, as indicated by a drop of conductivity from 4,000 to 5,000 mho before column filtration to 1.5–2.5 mho thereafter.

Following the above-described process, 75 kg. of fresh beef liver (22.5 kg. dry weight), yields about 25–40 grams (0.12–0.17 percent) of final precipitate from the $(NH_4)_2SO_4$ step and 7 to 9 grams of orgotein, equivalent to an overall yield of 0.032–0.041 percent calculated on the dry weight of the liver. The thus-produced orgotein contains the aforesaid tenacious extraneous proteins, even lots of a purity of 94 percent or higher.

Preparation 2 - Substantially pure orgotein

The procedure of preparation 1 is followed, except the filtrate from step (a), instead of being diluted with acetone, is first heated for 15–20 minutes at 60° C., then rapidly cooled to about 5° C. The resulting precipitate is removed by filtration or centrifugation and discarded. The filtrate is then treated with acetone as in step (b). Step (c) is omitted. The precipitate obtained from the acetone treatment is dissolved to a concentration of at least 8 percent in 0.025 M tris-glycine buffer containing $10^{-3}$ M $Mg^{++}$, $10^{-4}$ M $Cu^{++}$ and $10^{-5}$ M $Zn^{++}$ at pH 7.5 and then treated as in steps (d), (e) and (f).

EXAMPLE 1

Heat Treatment of Substantially Pure Orgotein

The following experiment was designed to determine total protein loss by heating substantially pure orgotein at 70° C. for up to 60 minutes.

Solutions of a production lot of orgotein of about 90 percent purity at a concentration of 5 mg. protein per ml. of 0.005 M glycine buffer, pH 8.5, in 0.9 percent saline were pipetted into each of five clean glass containers of equal size. This lot of orgotein contained 10.5 percent slow-moving extraneous proteins, based on stain intensity (Amido Black) of electrophoretically separated slow-moving extraneous protein. Container 1 was used as a control, and containers 2 to 5 were heated at 70° C. at 15, 30, 45, and 60 minutes, respectively.

After heating, the orgotein solution in each of the containers, including the control, was filtered through Millipore. A biuret protein determination was made on the clear filtrate. Each of the test tubes contained the following:

0.5 ml. filtered orgotein solution
0.5 ml. buffer
1.5 ml. biuret reagent

The heated samples were examined electrophoretically in thin film agarose gels. Slow-moving and backward-moving material in the orgotein sample was removed to some degree after heating 15 minutes at 70° C. and more so after heating 30 minutes at 70° C. They were completely removed after heating for 45 to 60 minutes at 70° C. At this point the background of the electropherogram looked much clearer, also.

After incubating the test tubes at 37° C. for 15 minutes, the test tubes were read at 555 m$\mu$ against a buffer blank. The $A_{555}$ absorbance of solutions of orgotein is directly and linearly related to the concentration of orgotein in solution, as shown by the following table.

| Conc. of protein, mg./ml. | Absorbance at $A_{555}$ | Conc. of protein mg./ml. | Absorbance at $A_{555}$ |
|---|---|---|---|
| 0.2 | 0.0207 | 1.2 | 0.124 |
| 0.4 | 0.0415 | 1.4 | 0.145 |
| 0.6 | 0.062 | 1.6 | 0.166 |
| 0.8 | 0.083 | 1.8 | 0.186 |
| 1.0 | 0.103 | 2.0 | 0.207 |

The total protein loss as a result of the post-heating step can be calculated from the absorbance of the initial and final solution at $A_{555}$. Total protein loss (percent) was determined by the formula:

$$\frac{\text{Protein conc. (after heating)} \times 100}{\text{Protein conc. (control)}}$$

The protein lost from the samples in the above-described heat-treatment as set forth in the table below.

| Heating conditions | $A_{555}$ | Protein conc. (from std. curve), mg./ml. | Percent protein loss |
|---|---|---|---|
| Control | 0.254 | 2.5 | 0 |
| 15 min. at 70° C | 0.205 | 2.0 | 20 |
| 30 min. at 70° C | 0.200 | 1.95 | 22 |
| 45 min. at 70° C | 0.189 | 1.85 | 26 |
| 60 min. at 70° C | 0.189 | 1.85 | 26 |

After heating at 70° C. for 60 minutes protein loss was 26 percent. Since there were about 10 percent protein impurities in the starting orgotein, about 16 percent of the orgotein was lost by post-heating for 45 or 60 minutes at 70° C.

To compare this loss with the loss which would be obtained if the severity of the heating conditions of the heating step of the isolation process were increased, the heating step temperature and time in that step of the isolation process were increased from 60° C. for 20 minutes to 70° C. for 1 hour. After removal of the precipitated protein, the protein remaining in solution was examined electrophoretically. Only small amounts of orgotein remained.

To determined whether a second heating step could be employed in the isolation process after the first heating step and before gel filtration, the precipitate from the 45–65 percent ammonium sulfate precipitation step was heat treated for 60 minutes at different temperatures. This precipitate represents purified orgotein intermediate, just prior to gel filtration, and consists of orgotein of about 20 percent purity. The precipitate was dissolved in 0.025 M tris-glycine buffer, pH 7.8, containing soluble salts providing $10^{-3}$ M $Mg^{++}$, $10^{-4}$ M $Cu^{++}$ and $10^{-5}$ M $Zn^{++}$, dialyzed to negative $SO_4^{++}$ and lyophilized. Portions of the lyophilized product at 10 mg. protein/ml. were dissolved in 0.005 M glycine, 0.9 percent saline buffer. The original buffer pH of 8.5 dropped to 7.2 after dissolution. The pH of one sample was brought back to 8.5 with NaOH. All samples were heated for 1 hour at the temperatures shown in the table below.

| Sample | Appearance | Absorbance $A_{280}$ | Absorbance $A_{680}$ | Absorbance $A_{555}$ |
|---|---|---|---|---|
| 1. Control | Clear | 0.74 | .025 | .085 |
| 2. 60° C | Turbid | 1.00 | .054 | .083 |
| 3. 65° C | More turbid | 1.22 | .078 | .085 |
| 4. 70° C | Very turbid | 1.22 | .060 | .070 |
| 5. 70° C. (pH 8.5) | do | 1.10 | .060 | .083 |

Based on $A_{280}$, $A_{555}$ (biuret) and $A_{680}$ (turbidity) absorptions, and the appearance of thin-film agarose electropherograms (30 min. in 0.02 M tris-glycine buffer, pH 8.45, at 3.5 mA from 280 volt to 340 volt, using 1$\lambda$ or 2$\lambda$ of 10 mg./ml. solutions) 70° C. for 1 hour at pH 7.2 or 8.5 appeared optimum. The following quantitative experiment was then conducted.

Two 220 mg. portions of the above-described sample of orgotein intermediate were placed in clean glass vessels. One portion was dissolved in 20 ml. of 0.005 M glycine, 0.9 percent saline buffer, pH 8.51. The pH of the resulting protein solution was 7.6. The other portion was dissolved in 20 ml. of 0.005 M glycine, 0.9 percent saline buffer with the pH adjusted to 10 with 0.1 N NaOH. The pH of the resulting solution was 9.5.

The two protein solutions were each heated at 70° C. for 1 hour. Both solutions turned milky white but no precipitate was formed. Upon cooling to 5° C. in an ice bath, a jellylike material formed around the rim of the test tubes, with the protein solutions still turbid and no defined precipitate visible.

The protein solutions were each filtered through Versapor. The filtrate was still turbid. No precipitate except a few pieces of jellylike product were retained on the Versapore filter.

Each filtrate was dialyzed against deionized water overnight. The conductivity of the dialysis water was down after one more change of deionized water. However, the protein solutions inside the dialysis tubings still remained turbid with no precipitate visible. Dialysis was continued for another hour with another change of deionized water. At that time a fine precipitate had formed. Each protein solution was filtered through Millipore. The filtrate was clear. Both filtrates were then lyophilized.

Yield of protein from portion one (pH 8.5 buffer) =
  23 mg. or 23/200 × 100 = 11.5 percent
Yield of protein from portion two (pH 10 buffer) =
  17 mg. or 17/200 × 100 = 8.5 percent Electropherograms showed the product heated in the pH 8.5 buffer to be much purer and practically free of slow-moving material. However, the yield was low, i.e., only 11.5 percent. Since an overall yield of about 10 percent is usually realized in going from 45–65 percent ammonium sulfate precipitate step through two Sephadex gel filtrations to the isolated pure orgotein, the yield of pure orgotein yield with this step incorporated would be no more than 3-4 percent, or about onethird or less than the usual yield whereas heating orgotein after Sephadex gel filtration removes slow-moving and background material with an orgotein loss of only about 10-25 percent.

EXAMPLE 2

To determine the effect of the post-heat treatment of orgotein on its $A_{280}$ absorbance, 100 mg. of substantially pure orgotein was dissolved in 40 ml. of 0.005 M glycine, 0.9 percent saline buffer pH 8.5, to give a solution of 2.5 mg. of orgotein per ml. of buffer. The solution was heated at 70° C. for 45 minutes, centrifuged to remove the precipitate and the supernatant was filtered through Millipore. The filtered solution was used for $A_{555}$ and $A_{280}$ determination. The results are shown in the tables below.

| Sample | $A_{.555}$, biuret | $A_{.555}$, corr.[1] | Protein conc., mg./ml. | $A_{.280}$ | $A_{.280}$ corr.[1] | $A_{.280}$/mg. |
|---|---|---|---|---|---|---|
| Undiluted | 0.212 | 0.210 | 2.05 | | | |
| 1:4 dilution | 0.555 | 0.051 | 0.50 | 0.264 | 0.259 | [2] 0.518 |

[1] Cuvette correction.
[2] Before dialysis.

The total protein loss was 2.50–2.05 mg. = 0.45 mg. or 18 percent. By gel electrophoresis, the starting orgotein was known to contain about 10 percent impurities. Therefore, the orgotein lost in the purification was about 8 percent.

In other experiments, the filtered heated supernatant was dialyzed for 1 hour against 0.03 M tris, 0.005 M glycine buffer pH 7.8, containing $10^{-3}$ M $Mg^{++}$, $10^{-4}$ M $Cu^{++}$, $10^{-5}$ M $Zn^{++}$, 0.02 percent sodium azide. Thereafter, it was dialyzed against deionized water, filtered and lyophilized. The $A_{280}$ of the heated orgotein sample after dialysis and lyophilization dropped considerably more to $0.24 \pm 0.02$/mg. protein. Dialysis appeared to remove some highly absorbing ($A_{280}$) low molecular weight impurities. With another lot of orgotein, the $A_{280}$ after heating at 70° C. for 1 hour and before dialysis was 0.2780/mg. protein. Subsequent dialysis of the heated supernatant did not lower the $A_{280}$ significantly. The $A_{280}$ of another lot of orgotein after heat and dialysis was 0.252/mg. protein.

The precipitate formed during heating was triturated in 0.1 ml. of 0.02 M tris glycine buffer, pH 8.45. The precipitate did not seem to be significantly soluble in this buffer. Thereafter, 0.4 ml. of 0.1 M tris glycine buffer, pH 10.6, in 1 percent sucrose was added. A small amount of the precipitate seemed to dissolve in the tris sucrose solution. After centrifugation, the supernatant was saved for electrophoresis. From the intensity of the Coumassie Blue Stain, the concentration of the protein in the solution was around (0.5 mg./3 ml.) = 0.17 mg./ml. Had the precipitate dissolved completely, the concentration of the solution would have been (1.8 mg./0.5 ml.) = 3.6 mg./ml. Therefore, (0.17/3.6) × 100 = 4.7 percent of the precipitate dissolved.

To the undissolved precipitate, 0.5 ml. of 0.01 N NaOH was added. All the precipitate went into solution. An electropherogram was run with the solution. Only a nondefined smear, typical of denatured protein appeared.

What is claimed is:

1. A process for producing pure orgotein from samples of substantially pure orgotein containing tenacious heat-labile extraneous proteins, most of which are slower moving than orgotein in gel electrophoresis, which raise the $A_{280}^{1\%}$ of a solution of the sample of orgotein substantially above $2.3 \pm 0.2$, which have about the same molecular volume as orgotein, which are stable to heating in a buffer solution at 60° C. for 10–20 minutes and which have about the same solubility as orgotein in buffer, in buffer-organic solvent mixtures and in ammonium sulfate solutions, which comprises heating the substantially pure orgotein containing the tenacious extraneous proteins in a buffer solution at a pH between 1 and 4 or between 6 and 11 having dissolved therein a salt of a divalent metal having an ionic radius of 0.60 to 1.00 A. at a temperature of at least about 65° C. at which the substantially pure orgotein is stable, until the $A_{280}^{1\%}$ of a solution of the orgotein is about $2.3 \pm 0.2$.

2. The process according to claim 1, wherein the orgotein is heated at about 70° C. for at least 30 minutes.

3. A process according to claim 1, wherein the orgotein is heated in a glycine-saline buffer solution at about pH 8.5.

4. A process according to claim 1 wherein the buffer solution contains a mixture of $MG^{++} Cu^{++}$ and $Zn^{++}$ ions.

5. A process according to claim 1 wherein the concentration of orgotein in the buffer solution is from about 5 to 20 mg./liter.

6. A process according to claim 5 wherein a solution of the orgotein in a glycine-saline buffer of about pH 8.5 which contains a mixture of $Mg^{***}$, $Cu^{++}$ and $Zn^{++}$ ions is heated at about 70° C. for about 45–60 minutes.

7. A process according to claim 5 wherein a solution of the orgotein in a tris-glcyine buffer of about pH 7.8 which contains a mixture of $Mg^{++}$, $Cu^{++}$ and $Zn^{++}$ ions is heated at about 70° C. for about 45–60 minutes.

8. In a process of isolating orgotein from a mixture of proteins which comprises the step of heating a solution of substantially impure orgotein in a buffer solution at a pH between 1 and 4 or between 6 and 11 containing a salt of a divalent metal having an ionic radius of 0.60 to 1.00 A. to a temperature of at least 50° C. until substantially all of the heat-labile proteinaceous impurities are removed, the step of thereafter heating a solution of substantially pure orgotein containing tenacious heat-labile extraneous proteins, most of which are slower moving than orgotein in gel electrophoresis, which raise the $A_{280}^{1\%}$ of a solution of the sample of orgotein substantially above $2.3 \pm 0.2$, which have about the same molecular volume as orgotein, which are stable to heating in a buffer solution at 60° C. for 10–20 minutes and which have about the same solubility as orgotein in buffer, in buffer-organic solvent mixtures and in ammonium sulfate solutions, in such a buffer at a temperature of at least 65° C. which is higher than that employed in the first heating step until the remainder of the proteins more heat-labile than orgotein are removed.

9. A process according to claim 8 wherein the temperature of the first heating step is about 60–65° C. and the temperature of the second heating step is about 65–75° C.

10. A process according to claim 8 wherein the orgotein is heated in a glycine-saline buffer solution at about pH 8.5.

11. A process according to claim 8, wherein the buffer solution contains a mixture of $Mg^{++}$, $Cu^{++}$ and $Zn^{++}$ ions.

12. A process according to claim 8 wherein the concentration of orgotein in the buffer solution is from about 5 to 20 mg./liter.

13. A process according to claim 12 wherein a solution of the orgotein in a glycine-saline buffer about pH 8.5 which contains a mixture of $Mg^{++}$, $Cu^{++}$ and $Zn^{++}$ ions is heated at about 70° C. for about 45–60 minutes.

14. A process according to claim 12 wherein a solution of the orgotein in a tris-glycine buffer of about pH 7.8 which contains a mixture of $Mg^{++}$, $Cu^{++}$ and $Zn^{++}$ ions is heated at about 70° C. for about 45–60 minutes.

* * * * *